(12) United States Patent
Rich et al.

(10) Patent No.: US 8,467,098 B2
(45) Date of Patent: Jun. 18, 2013

(54) AUTOMATED INK COLOR MATCHING OF SOLIDS AND TONES

(75) Inventors: Danny Rich, Hamilton Square, NJ (US); Edward Rabbitts, Bristol (GB); Kent Zessin, Rock Hill, SC (US)

(73) Assignee: Sun Chemical Corporation, Parsippany, NJ (US)

( * ) Notice: Subject to any disclaimer, the term of this patent is extended or adjusted under 35 U.S.C. 154(b) by 719 days.

(21) Appl. No.: 12/583,938

(22) Filed: Aug. 27, 2009

(65) Prior Publication Data

US 2010/0067056 A1    Mar. 18, 2010

Related U.S. Application Data

(60) Provisional application No. 61/092,164, filed on Aug. 27, 2008.

(51) Int. Cl.
*H04N 1/405* (2006.01)
(52) U.S. Cl.
USPC .............................. 358/2.1; 358/468
(58) Field of Classification Search
USPC ............................ 358/1.9, 2.1, 506, 500, 468
See application file for complete search history.

(56) References Cited

U.S. PATENT DOCUMENTS

| | | | |
|---|---|---|---|
| 7,034,960 B2 | 4/2006 | Stone et al. | |
| 7,109,903 B2 | 9/2006 | Suzuki | |
| 7,202,976 B2 | 4/2007 | Stone et al. | |
| 7,268,918 B2 | 9/2007 | Postle et al. | |
| 7,280,118 B2 | 10/2007 | Senn et al. | |
| 2002/0016405 A1 | 2/2002 | Friel et al. | |

(Continued)

OTHER PUBLICATIONS

International Search Report and Written Opinion of the International Searching Authority, issued for corresponding PCT Application No. PCT/US2009/04937, dated Oct. 30, 2009.

(Continued)

*Primary Examiner* — Thomas D Lee
*Assistant Examiner* — Stephen M Brinich
(74) *Attorney, Agent, or Firm* — McKenna Long & Aldridge LLP

(57) ABSTRACT

In the development of custom SPOT color inks, there will be only a single combination of pigments that will produce the correct color for both the solid tones and for one or more halftones intermediate between the full tone and the unprinted substrate. A novel system and method is presented for finding such a combination of colorants without requiring a complex suite of software algorithms. The method includes a search of a library of known colored inks printed onto a specified substrate and printed using specified printing conditions. Each record of such a library can contain, for example, the ink formula, the combination of colorants and resin, the spectral reflectance factor of the ink and substrate, color values (XYZ and CIELAB) of the solid ink color (100% tone) and 10% steps down to 0% (unprinted substrate). In such a database halftones can be specified in units of % (0% to 100%), but can also, for example, be given as 8-bit integers (0 to 255). In exemplary embodiments of the present invention, such a search locates the solid ink color that meets the color requirements and simultaneously meets the color requirements at one or more intermediate halftone steps. The claimed method can thus achieve a printing ink formula that produces a color match to a customer proof at both the solid color and at one or more halftones with ink coverages lying between the unprinted substrate (0% tone) and the fully printed substrate (100% tone).

37 Claims, 14 Drawing Sheets
(6 of 14 Drawing Sheet(s) Filed in Color)

U.S. PATENT DOCUMENTS

| | | | |
|---|---|---|---|
| 2002/0149770 A1 | 10/2002 | Kubo et al. | |
| 2004/0058130 A1 | 3/2004 | Nissing | |
| 2004/0145758 A1 | 7/2004 | Lamy | |
| 2005/0030330 A1 | 2/2005 | Pinard et al. | |
| 2005/0083540 A1* | 4/2005 | Hersch et al. | 358/1.9 |
| 2005/0094209 A1 | 5/2005 | Hasler et al. | |
| 2007/0091138 A1 | 4/2007 | Hersch et al. | |
| 2007/0263249 A1 | 11/2007 | Rich et al. | |

OTHER PUBLICATIONS

Copending U.S. Appl. No. 11/732,086 (U.S. Appl. Published No. 2007/0263249).

J.A.C. Yule and W.J. Nielsen, "The Penetration of Light into Paper and Its Effect on Halftone Reproduction", Proc. TAGA, vol. 4, pp. 66-75 (1951).

F.R. Clapper, J.A.C. Yule, "The Effect of Multiple Internal Reflections on the Densities of Half-tone Prints on Paper", Journal of the Optical Society of America, vol. 43, No. 7, pp. 600-603, (1953).

G.L. Rogers, "Optical dot gain: lateral scattering Probabilities" Journal of Imaging Science and Technology, 42:341-345 (1998).

G. L. Rogers, "A generalized Clapper-Yule model of halftone reflectance", Color Research & Application, vol. 25, pp. 402-407 (2000).

* cited by examiner

BRAND COLOR INKS

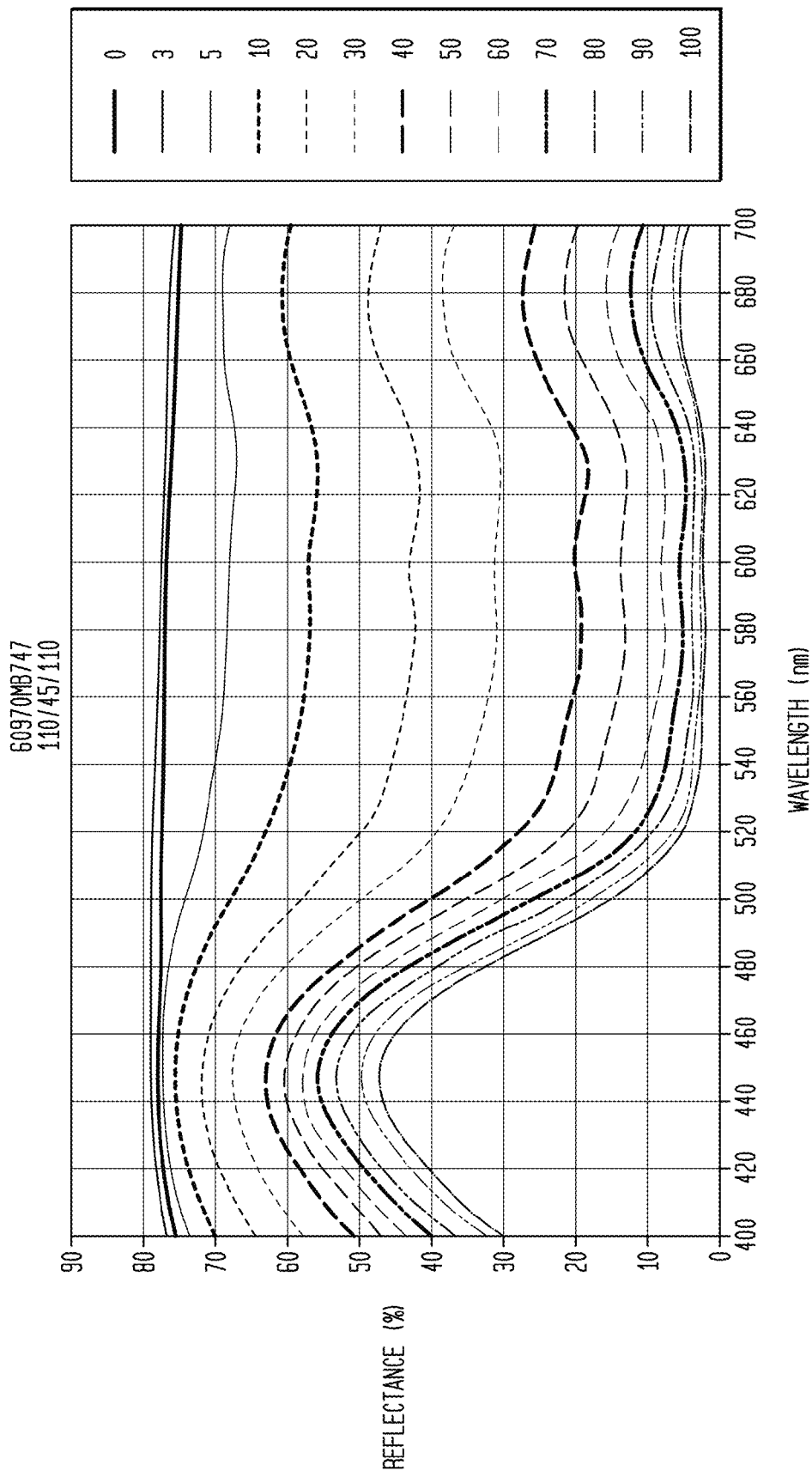

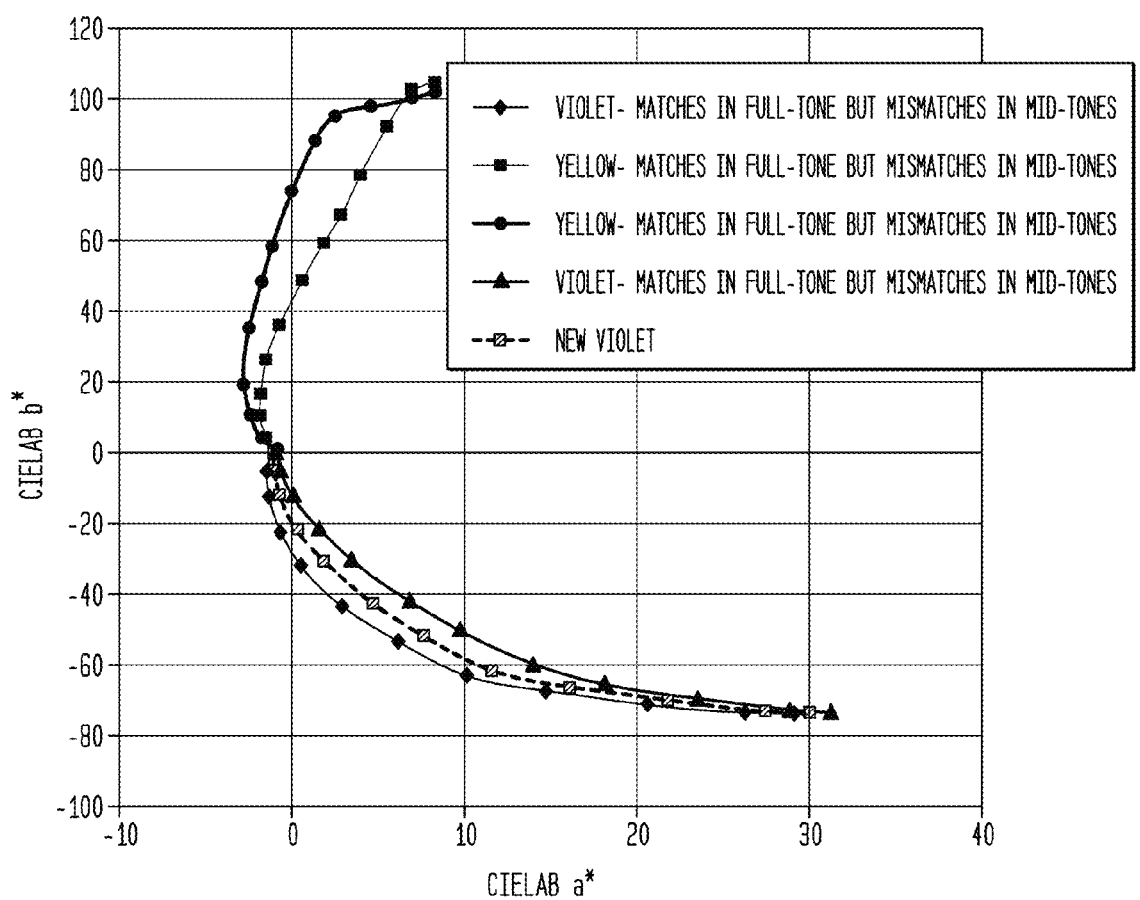

FIG. 9

| Palette | Colour | Tone | Name | Formulation | L | a | b | DeltaE | Ink System | Laminate | Engraving | Spectro | Substrate | Print Method |
|---|---|---|---|---|---|---|---|---|---|---|---|---|---|---|
| Add | | 100 | RD1080 SAFL WTK 8.8 | CL_RD1080 | 55.96 | 49.51 | 28.76 | 1.43 | CHB (Saturn) | | Flexo 8.8g/m² | datacolor Mercury SCI | White Top Kraft | Flexo Lab Proof |
| Add | | 100 | RD1080 SAFL WTK 10.2 | CL_RD1080 | 55.48 | 49.58 | 28.79 | 1.56 | CHB (Saturn) | | Flexo 10.2g/m² | datacolor Mercury SCI | White Top Kraft | Flexo Lab Proof |
| Add | | 100 | RD1037 SAFL WTK 4.6 | CL_RD1037 | 54.62 | 51.74 | 26.99 | 2.13 | CHB (Saturn) | | Flexo 4.6g/m² | datacolor Mercury SCI | White Top Kraft | Flexo Lab Proof |
| Add | | 100 | RD1115 SAFL WTK 6.9 | CL_RD1115 | 54.99 | 48.59 | 27.53 | 2.24 | CHB (Saturn) | | Flexo 6.9g/m² | datacolor Mercury SCI | White Top Kraft | Flexo Lab Proof |
| Add | | 100 | RD1018 SAFL WTK 10.2 | CL_RD1018 | 55.58 | 52.17 | 26.35 | 2.26 | CHB (Saturn) | | Flexo 10.2g/m² | datacolor Mercury SCI | White Top Kraft | Flexo Lab Proof |
| Add | | 100 | RD1018 SAFL WTK 8.8 | CL_RD1018 | 56.1 | 51.57 | 25.68 | 2.31 | CHB (Saturn) | | Flexo 8.8g/m² | datacolor Mercury SCI | White Top Kraft | Flexo Lab Proof |
| Add | | 100 | RD1080 SAFL WTK 8.0 | CL_RD1080 | 57.27 | 48.32 | 27.74 | 2.41 | CHB (Saturn) | | Flexo 8.0g/m² | datacolor Mercury SCI | White Top Kraft | Flexo Lab Proof |
| Add | | 100 | RD1115 SAFL WTK 8.0 | CL_RD1115 | 53.96 | 49.67 | 28.39 | 2.45 | CHB (Saturn) | | Flexo 8.0g/m² | datacolor Mercury SCI | White Top Kraft | Flexo Lab Proof |
| Add | | 100 | RD1069 SAFL WTK 8.8 | CL_RD1069 | 54.47 | 48.68 | 27.49 | 2.48 | CHB (Saturn) | | Flexo 8.8g/m² | datacolor Mercury SCI | White Top Kraft | Flexo Lab Proof |
| Add | | 100 | RD1091 SAFL WTK 4.8 | CL_RD1091 | 57.09 | 49.06 | 29.64 | 2.56 | CHB (Saturn) | | Flexo 4.8g/m² | datacolor Mercury SCI | White Top Kraft | Flexo Lab Proof |

FIG. 10

SMART COLOUR™ home | show all | search | colour | formulation | palette | options | log out

Search

Macth Red
Search on Lab values

L 56.18
a 50.47
b 27.72

Within range of: DeltaE 5
Show tones from: 100 to 100
Film weight: 4 to 6

Ink System: CHB (Saturn)
Substrate: White Top Kraft
Laminate: None
Backed by White: ☐
Print Method: Flexo Lab Proof
Engraving: Any
Spectro: datacolour Mercury S Show Me: 10 results
Order results by: DeltaE
Submit

AUTOMATED INK COLOR MATCHING OF SOLIDS AND TONES

CROSS REFERENCE TO OTHER APPLICATIONS

This application claims the benefit of U.S. Provisional Patent Application No. 61/092,164, filed on Aug. 27, 2008, which is hereby incorporated herein by reference in its entirety.

TECHNICAL FIELD

The present invention relates to color ink production, and more particularly to precisely matching the ink color of special brand colors, also known as SPOT colors, at both the solid color and one or more halftones.

BACKGROUND OF THE INVENTION

Commercial color-matching software and the algorithms which they make use of, such as, for example, those based on the Kubelka-Munk two-flux model or, for example, newer models based on a multi-flux theory, such as are described in, for example, U.S. Pat. No. 7,109,903 to Cappelle and U.S. Pat. No. 7,280,118 to Senn, or, for example, in U.S. Published Patent Application Nos. 2007/0091138 to Hersch, 2005/0094209 to Hasler and 2004/0145758 to Lamy, attempt to solve either the problem of solid color matching using subtractive color mixing laws, or document how to print ink as a tone scale using additive color mixing laws.

Blatantly absent from such conventional solutions are methods that allow for the simultaneous computing of a match for both the additive color and the subtractive color. This absence is due to the complexity of computing a subtractive match to obtain the correct composition of matter to reproduce a specific brand color in an ink followed closely by computing an additive match to reproduce the halftone appearance of the current ink pigment combination. This is because subtractive color is produced when colorants, dyes or pigments are combined with a carrier such as a resin or binder and printed onto a substrate such as a label, package board, plastic film or foil. The colorants "subtract" a portion of the light incident on the substrate, in specific spectral bands so that the result is the familiar color stimulus. For example, a "red" pigment subtracts "blue" and "green" light from the spectrum, and only reflects red to a viewer.

In contrast to subtractive color production, additive color mixing occurs when light from one printed area is combined with light from a neighboring area. For example, a "red" area surrounded by unprinted "white" substrate mixes additively to produce a light red, or pink, appearance. In fact, the actual additive combination includes many special effects that must modeled, including (i) the physical transfer of the ink dot to the substrate where the size of the dot on a printing form or plate may produce a larger dot than intended, known as physical dot gain, or (ii) the dot may appear to be larger than it actually is due to lateral propagation of light through the substrate that passes up through the ink dot, known as optical dot gain. These and similar effects can produce a subtractive color that is intermediate between the normal ink dot color and the unprinted substrate color.

These and related effects have been systematically studied over the years by J. A. C. Yule and others, such as, for example, in the following papers: J. A. C. Yule and W. J. Nielsen, "The Penetration of Light into Paper and Its Effect on Halftone Reproduction", *Proc. TAGA*, vol. 4, pp. 66-75 (1951); F. R. Clapper, J. A. C. Yule, "The Effect of Multiple Internal Reflections on the Densities of Half-tone Prints on Paper", *Journal of the Optical Society of America*, Vol. 43, No. 7, pp. 600-603, (1953); G. L. Rogers, "Optical dot gain: lateral scattering Probabilities" *Journal of Imaging Science and Technology*, 42:341-345 (1998); and G. L. Rogers, "A generalized Clapper-Yule model of halftone reflectance", *Color Research & Application*, Vol. 25, pp 402-407 (2000).

The conventional assumption is that additive color mixing is a purely linear process in which the color of the print changes uniformly and linearly from an unprinted substrate (0% tone) to a fully printed area (100% tone). This forms the basis for traditional four-color process printing. Process printing inks contain one colorant or occasionally a first major colorant and a second minor colorant. Due to their linear nature at the various halftone steps (i.e. from 100% tone strength all the way down to 0%), mono-pigmented CMYK process colors allow for the prediction of ink color formulae that accurately reproduce color standards.

However, when applied to brand colors, this assumption fails. "Brand" or SPOT color inks contain mixtures of multiple colorants that use subtractive mixing to produce a unique color stimulus. The term "brand colors" refers to customer-specific multi-pigmented colors that are often associated with a specific product or brand name, such as, for example, the precise hue of red and yellow used by Kodak in its packaging and advertising. Accordingly, brand colors are sometimes referred to as "special colors."

Conventional methods allow for reliable prediction of formulae for producing multi-pigmented spot colors—"brand colors"—that can accurately match a standard at 100% tone strength (i.e., solid color). However, when this same predicted formula for the brand color is printed at various halftone values, it often no longer matches the brand color standard due to the non-linear nature of multi-pigmented brand colors when printed at various halftone values. Thus, a need in the art exists for a system that can accurately predict a color formula that will match a brand color standard at both 100% tone strength as well as at any of the halftone steps up to the 100% tone value (e.g. 5%, 10%, 15% halftones, etc.).

Notwithstanding this need, conventional systems and methods have not attempted to match the colors of tone steps of SPOT colors. This is because the color of a tone step depends on the color of the solid, the density of the solid and the tone value increase of the printing plate. To know all of this data and thus accurately match the color of the tone step, one would need to have previously printed the ink, using a proofing system with a tone wedge.

Electronic color production hardware and software systems currently exist which read the visible spectrum of a color sample and generate data directed to measured amounts of light absorbed or reflected at particular points in the spectrum. Any given color has a spectral curve associated with it that functions as a signature of that color. Once a spectral curve is determined, the visible spectrum and coefficients are then processed to predict a color formula for reproducing the color. This measuring technique is more accurate than, for example, the colorimetric approach to color representation because the colors may be predicted for the same in any lighting environment.

The colorimetric representation is a numeric method (CIELAB) of representing a color, where "L" represents the lightness to darkness of a color, "A" represents the redness to greenness of a color and "B" represents the yellowness to blueness of a color. Using this system, similarity values between colors can be determined by calculating the sum of the squares of the differences between the individual L, A and B values. However, as noted, this method is not as comprehensive as determining spectral curves for a color because the values are applicable for only one lighting condition. Differing lighting conditions can product different shades of color, and then a new set of CIELAB values.

Other common color representations include, for example, RGB which represents the degree of red, green and blue in a color, and CMYK, which represents the degree of cyan, magenta, yellow and black in a given color. Accurate translation between color representations, such as, for example, a translation from RGB to CMYK for computer monitors and printers can be provided. Accurate color reproduction is achieved, in part, by retrieving data for a plurality of input and output devices, e.g., printers, monitors, and color measuring devices, and modifying the color translation formulas to account for the specific devices receiving the data.

One known system provides a method and apparatus for accurately matching colors. For example, spectral data are received from a color measuring device and the corresponding color is matched in an electronic color library. The desired color is compared to colors stored in the electronic color library and the color or colors in the library that are within a specified color range are reported. By searching within such an electronic library, the traditional standard color swatch book used for locating a desired color is replaced. However, such an electronic color library is vulnerable to problems associated with producing samples from multiple devices.

Given the common use of halftone printing, current color formulation technology does not meet marketplace needs inasmuch as the conventional emphasis is on matching only the solid ink color. As color printing processes—on a wide variety of substrates—now often take advantage of the both the solid color value and less saturated tone values in order to add depth and image detail in the coloring process (for example, via halftone, error diffusion and other pattern-generation methodology), a method of formulating a match to both a solid color and one or more tone values of the same color can bring improved repeatability to the coloring process. This approach can also aid in obtaining formulae that result in color matches between disparate materials (substrates), coloring/imaging processes and end-use applications.

In general, in the development of custom SPOT color inks, there will be only a single combination of pigments that will produce the correct color for both the solid tones and for halftones intermediate between the full tone and the unprinted substrate. What is thus needed in the art is an automated method for finding such a combination of colorants without requiring a complex suite of software algorithms.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For the purpose of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which:

FIGS. 6 and 7 depict exemplary spectral reflectance factor curves for two exemplary violet colors which match the SPOT violet color of FIG. 5 at the 100% tone, but mismatch at other tones;

FIG. 8 depicts an exemplary interpolated "NewViolet" halftone scale plotted on a gamut chart with the two inks of FIGS. 6 and 7 as components, according to an exemplary embodiment of the present invention;

FIG. 9 depicts an exemplary shade library record structure according to an exemplary embodiment of the present invention;

FIG. 10 depicts an exemplary shade library search screen according to an exemplary embodiment of the present invention;

SUMMARY OF THE INVENTION

In the development of custom SPOT color inks, there will be only a single combination of pigments that will produce the correct color for both the solid tones and for one or more halftones intermediate between the full tone and the unprinted substrate. A novel system and method is presented for finding such a combination of colorants without requiring a complex suite of software algorithms. The method includes a search of a library of known colored inks printed onto a specified substrate and printed using specified printing conditions. Each record of such a library can contain, for example, the ink formula, the combination of colorants and resin, the spectral reflectance factor of the ink and substrate, color values (XYZ and CIELAB) of the solid ink color (100% tone) and 10% steps down to 0% (unprinted substrate). In such a database halftones can be specified in units of % (0% to 100%), but can also, for example, be given as 8-bit integers (0 to 255). In exemplary embodiments of the present invention, such a search locates the solid ink color that meets the color requirements and simultaneously meets the color requirements at one or more intermediate halftone steps. The claimed method can thus achieve a printing ink formula that produces a color match to a customer proof at both the solid color and at one or more halftones with ink coverages lying between the unprinted substrate (0% tone) and the fully printed substrate (100% tone).

DETAILED DESCRIPTION OF THE INVENTION

In exemplary embodiments of the present invention, a color shade library or palette with both full tones (solids) and halftones can provide the means of finding a unique combination of colorants and ink film weight that can, for example, provide an optimum match for an entire tone scale, printed using a specified printing technology onto a specified substrate.

In general, in the development of custom SPOT color inks, there will be only a single combination of pigments that will produce the correct color for both the solid tones and for halftones intermediate between the full tone and the unprinted substrate. These multiple colorant combinations produce a unique spectral signature which leads to the combined behavior of solid color and halftone color. The failure of prior art reproduction schemes results from the fact that mapping the colorimetric or trichromatic properties which as can be seen in the figures produce strongly nonlinear behaviors.

Figure 1:
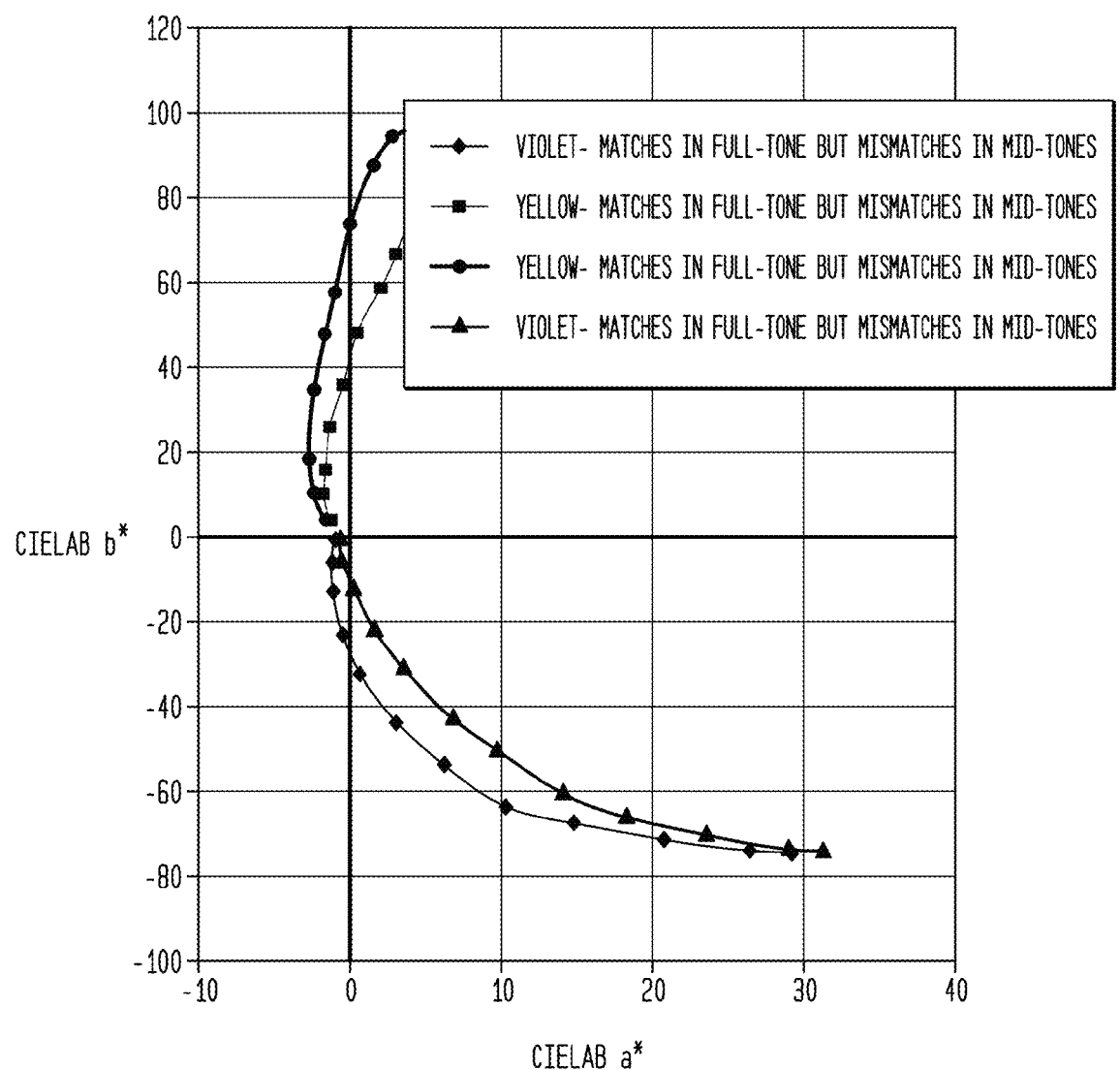
FIG. 1 depicts a chromaticness plot of a number of different exemplary SPOT color inks, where the 100% tones are nearly co-incident while the halftones are quite separated.

For example, FIG. 1 depicts a chromaticness plot of four different SPOT color inks. FIG. 1 exhibits the spectral output of two different formulae for a typical yellow and purple brand color at various halftone steps ranging from 0% (gray neutral—at the intersection of 0 CIELAB b* and 0 CIELAB a* at the center of the graph) to 100% (solid color—points furthest from gray neutral, yellows appearing at the upper right, violets appearing at the lower right of FIG. 1). While at 100% tone, both formulae for each of the two colors (i.e., yellow and violet) represent close matches, the colors do not match at most of the other halftone steps along the spectral curve. The shape of this contour, leading from 100% point to the 0% point is determined by the spectral signature of the particular combination of colorants used to produce the ink.

Figure 2A:
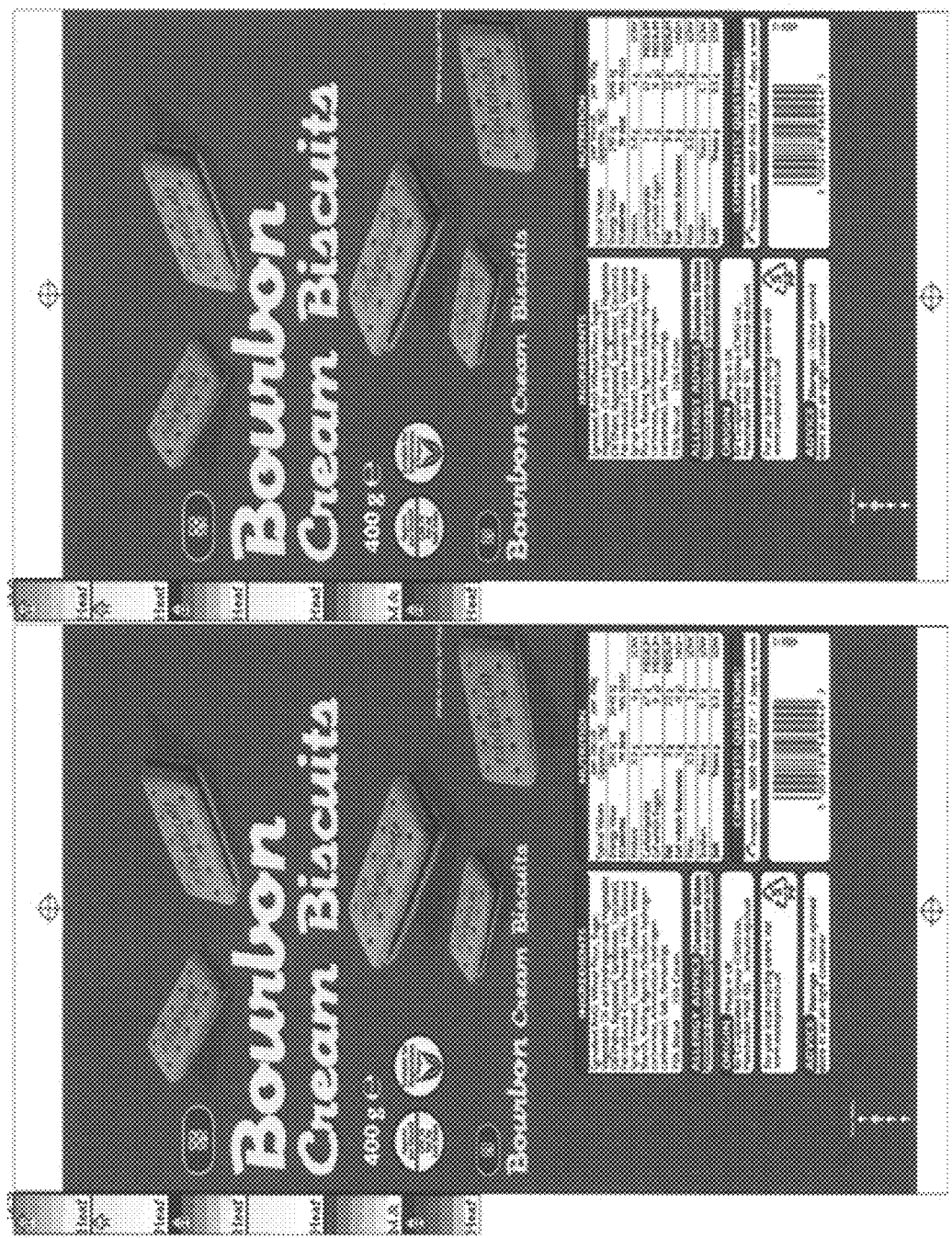
FIG. 2A depict an exemplary pair of printed labels showing a solid color match between two ink formulations.
Figure 2B:
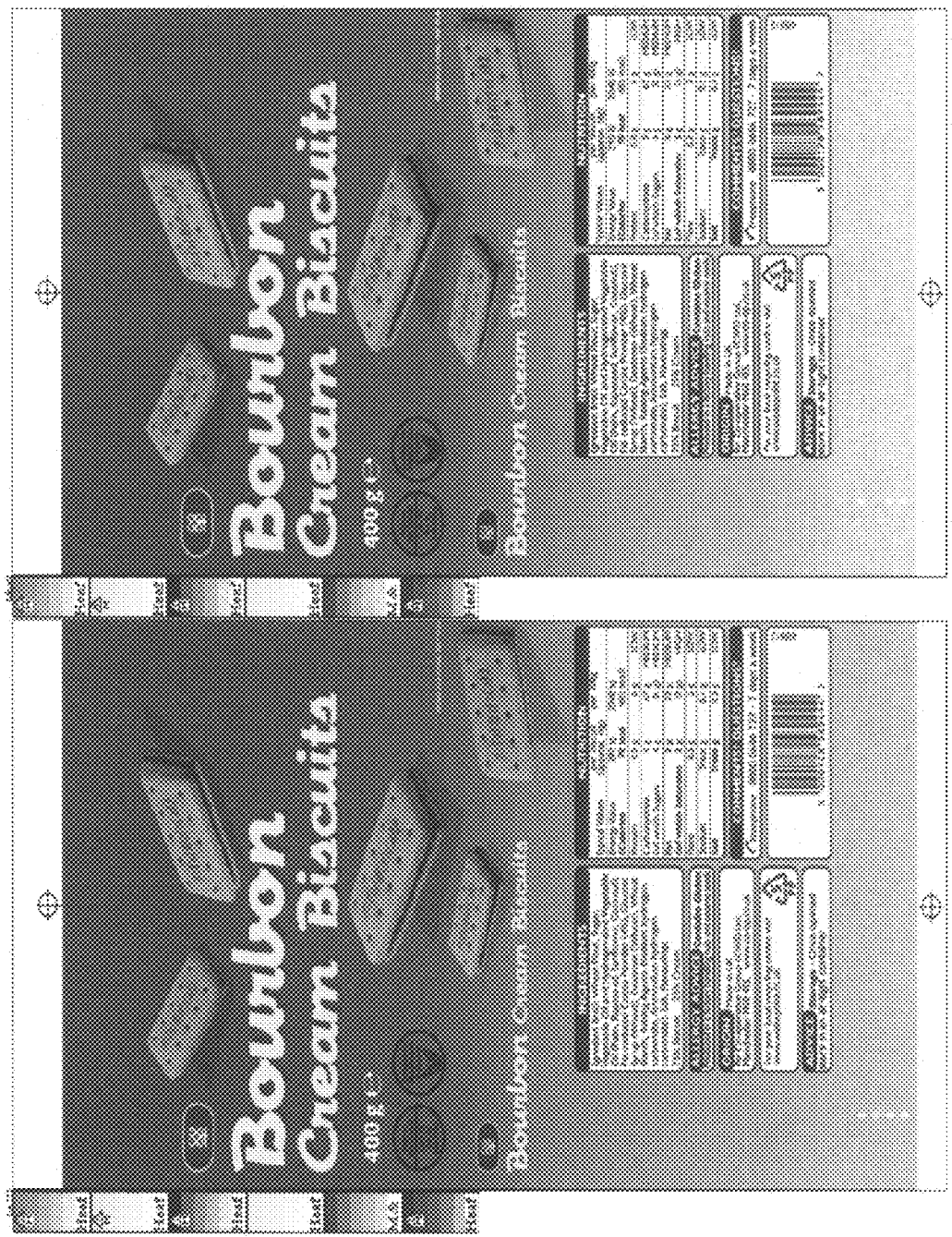
FIG. 2B depict the exemplary pair of printed labels shown in FIG. 2, but now with halftones used in the label design.

This situation is further illustrated in FIGS. 2 and 3. FIG. 2A depict an exemplary pair of printed labels showing a solid color match between two ink formulations. FIG. 2B depict the exemplary pair of printed labels shown in FIG. 2, but now with halftones used in the label design, and one can clearly see the mismatch all through the halftones between the two inks respectively used.

Figure 3A:
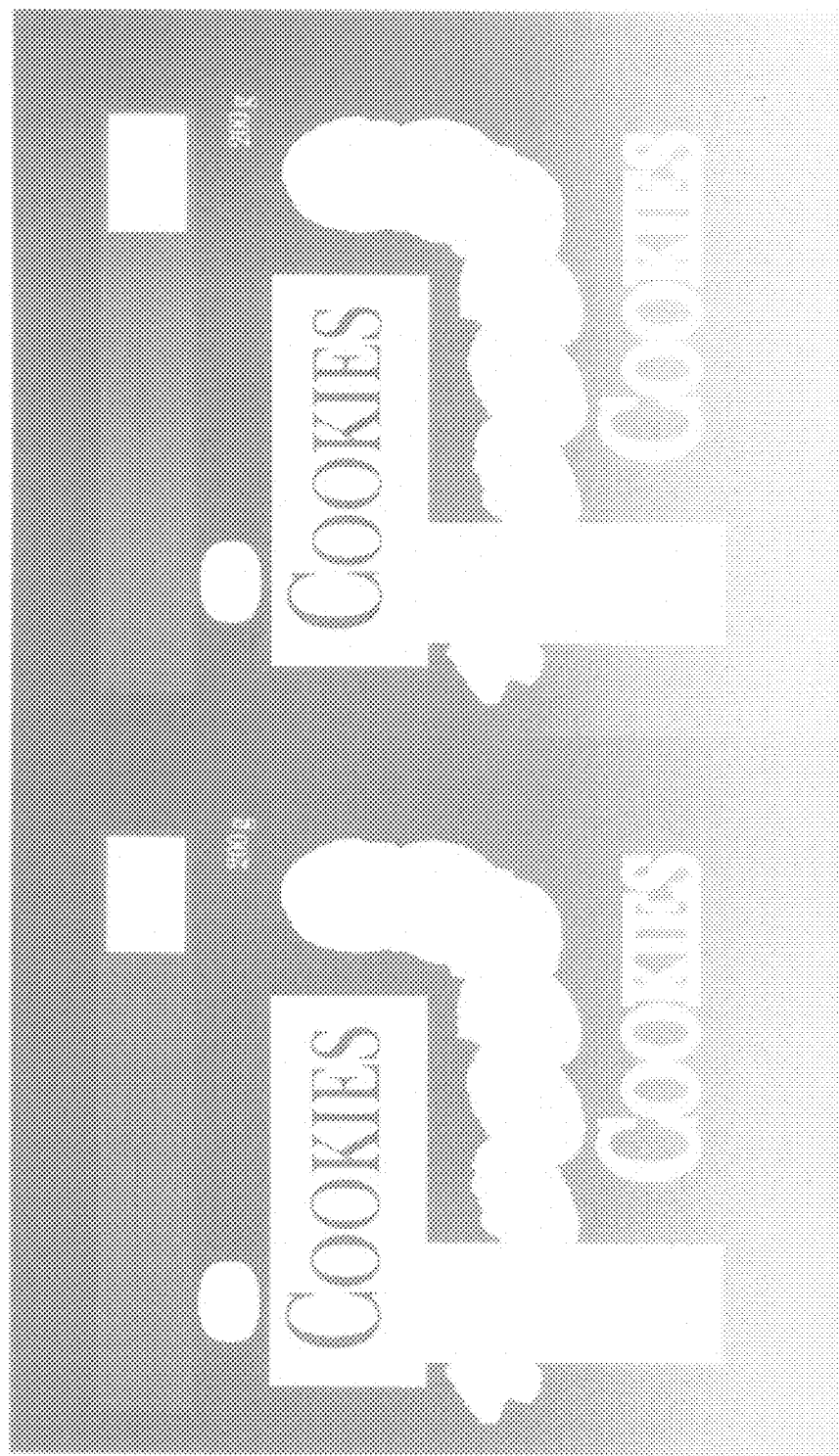
FIG. 3A depict an exemplary pair of printed boxes showing a solid color match but a halftone mismatch between two ink formulations.
Figure 3B:
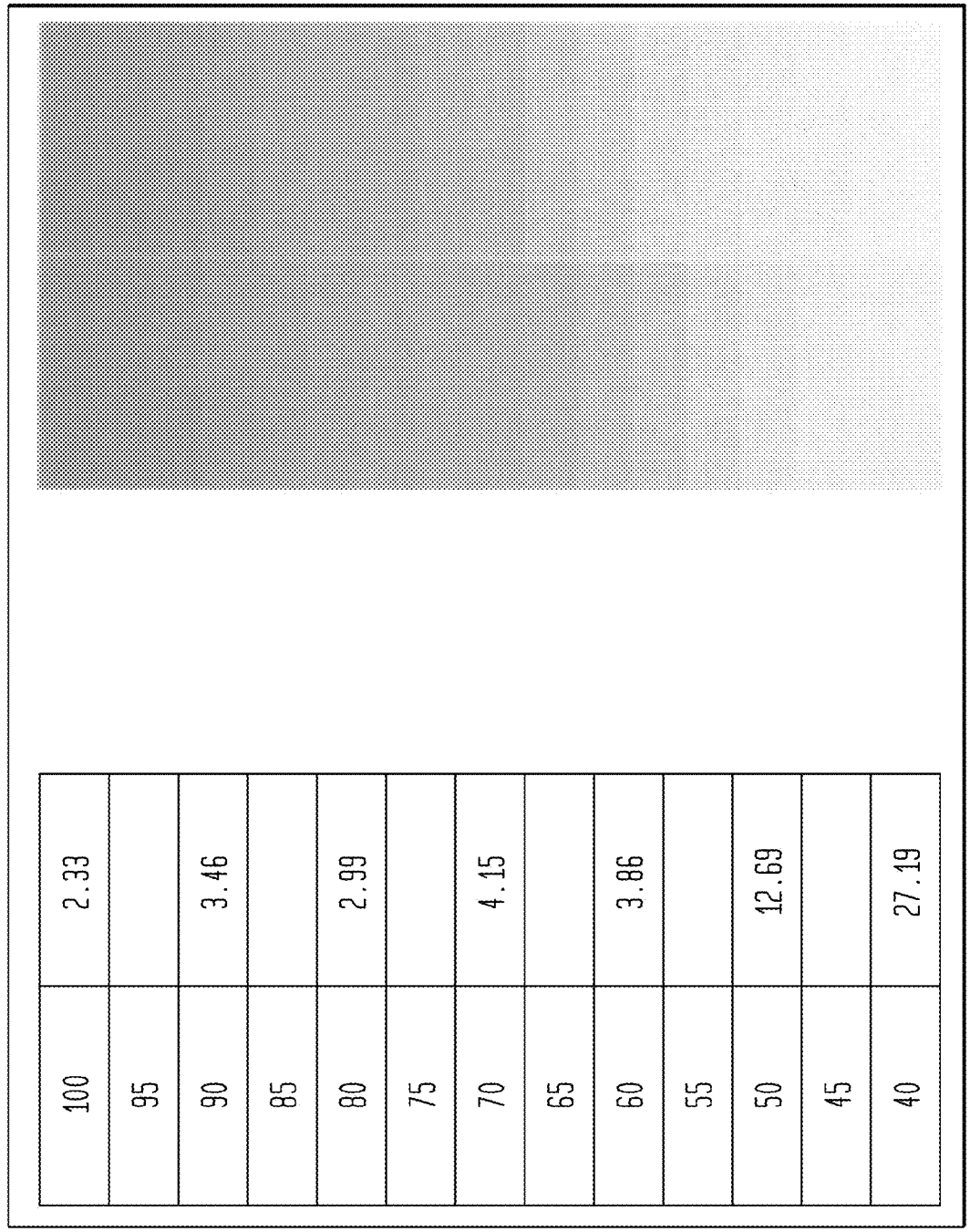
FIG. 3B depict a series of halftones between 40% and 100% and a side by side comparison of the halftones for each of the two ink formulations shown in FIG. 3A and the CIELAB color difference between the pairs of tones.

Similarly, FIG. 3A depict an exemplary pair of printed boxes showing a solid color match but a halftone mismatch between two ink formulations. FIG. 3B depict a series of halftones between 40% and 100% and a side by side comparison of the halftones for each of the two ink formulations shown in FIG. 3A, again showing the detailed mismatches at the halftones between 80% down to 40%.

Thus, FIG. 1 is a typical representation of prior art color matching systems, which, in this scenario, have accurately predicted formulae for 100% tone, or solid, brand colors, but in both the yellow and purple colors represented on the graph, the predicted formulae do not represent a satisfactory color match when printed at the vast majority of halftone values. Moreover, such an unsatisfactory match would not be discovered until the colors were actually printed on press at the various halftone values. A similar situation is shown in FIGS. 2-3. The present invention overcomes this problem by having previously mapped out the brand color across the gamut of 0-100% halftones and storing this information in a color library for later retrieval and incorporation into the formula before going to press.

In exemplary embodiments of the present invention, the spectral signatures of the solids and halftones for a variety of colors can be fully captured in a color library. The spectral signature allows the trichromatic color coordinates, such as, for example, CIELAB L*a*b* values, to be computed for any ink formula as printed on a given substrate.

The library of known formulas and halftones can then, for example, be searched for the ink that produces the correct color of the solid tone and for the 50% halftone. When that record is found, the information on producing the ink can then, for example, be displayed. If the exact formulation than can produce an acceptable color for both the solid tone and the specified halftone(s) is not found, it is possible to take two similar, but different ink formulas from the library and apply a simple interpolation to obtain the spectral signature of the ink formula that lies between them, producing an exact spectral signature that is required to produce the correct solid color and halftone color(s). This process is significantly faster and simpler than the conventional methods described above for attempting to produce the required color by sequential computation of a subtractive match followed by an additive match.

No single formula exists to give the numerical solution. Some of the cited prior art attempts to solve the two problems simultaneously or sequentially using a "trial & error" model—i.e., match the solid color, using a subtractive mixing model algorithm then run an additive mixing model to see if the tones and solids both meet requirements. If they do not, the subtractive match is request is requested again using a different combination of colorants and the tones again computed.

In exemplary embodiments according to the present invention, finding such an optimum match can provide a brand owner with improved brand equity in a given package design that uses halftones. For example, a logo or particular trade dress with specific color requirements can be printed on various substrates and using various processes, and the color specifications—including halftones—can be always correctly matched.

In exemplary embodiments according to the present invention such an optimum matching process can capitalize on the information contained in a shade library such as, for example, the SmartColour™ Global Shade Library provided by Sun Chemical Corporation of Parsippany, N.J., where both solid ink prints and tone scales printed at various film weights or plate frequencies on a multiple of job substrates are stored.

The creation of, application and communication/transmission of color information obtained from, a shade library has been disclosed in earlier patents under common assignment herewith. For example, U.S. Pat. No. 7,034,960 disclosed how to build a library of solid colors, U.S. Pat. No. 7,202,976 disclosed how to communicate the colors from a shade library electronically, and U.S. Pat. No. 7,268,918 disclosed how to control the metamerism in creating a unique color in an ink and at least one other material (plastic, paint, textile, paper) simultaneously using two or more shade libraries. Similarly, copending U.S. patent application Ser. No. 11/732,086 (U.S. Patent App. Pub. No. 2007/0263249) discloses the addition of halftone colors to a shade library. The disclosures of these three U.S. patents and this copending published patent application are hereby incorporated herein by reference in their entirety.

In exemplary embodiments of the present invention, a computerized shade library with a multitude of special color formulas can be used to find a formula which simultaneously matches a product standard for both the solid color and at one or more tone steps between the full tone (solid) and the unprinted substrate. This can be accomplished, for example, where such a computerized color shade library is stored in a data structure, such as a database, by executing a simple computer search on the library requesting the record in the database that has the correct color coordinates (CIE L*a*b* or CIE XYZ) for both a solid color print and halftone printed color from a specific printing process using a specific production substrate (e.g., clear film, opaque film, foil, board, paper, etc). The formula which matches the desired color at each of these points will be a unique composition of matter.

In such a database, each record can contain, for example, the ink formula, the combination of colorants and resin, the spectral reflectance factor of the ink and substrate, color values (XYZ and CIELAB) of the solid ink color (100% tone) and 10% steps down to 0% (unprinted substrate). In such a database halftones can be specified in units of % (0% to 100%), but can also, for example, be given as 8-bit integers (0 to 255).

Previous work of the present inventors related to a shade library that contains both solid colors and tone scales of custom blended mono-pigmented ink bases, metamerism control for multiple materials and processes for creating physical color standards for large brand owners. Given such methods and technologies, it occurred to the present inventors that tone scale matching/reproduction is also a form of, or subject to, metamerism. That is, it is possible to develop a series of ink formulas that can be made to match a target color ink when proofed as a solid, and at a specific film weight, but that each such formula will show a varying amount of mismatch at different film weights and different halftone steps. Moreover, while adjusting the film weight or the colorant or base ink mixture is a subtractive color process, changing the tone step color is an additive color process. Thus, printing such a library represents a unique set of color values for the solids and tones based on the unique composition of the SPOT color ink and the additive mixture of the unique color of the substrate and the dots of ink.

In exemplary embodiments of the present invention, an automated search can be performed for database records with matches at both solid and half tones of an input color. Additionally, if a precise match cannot be found, interpolation can be performed on the closest existing database records to obtain the proper formulation, as described more fully below.

Figure 4:
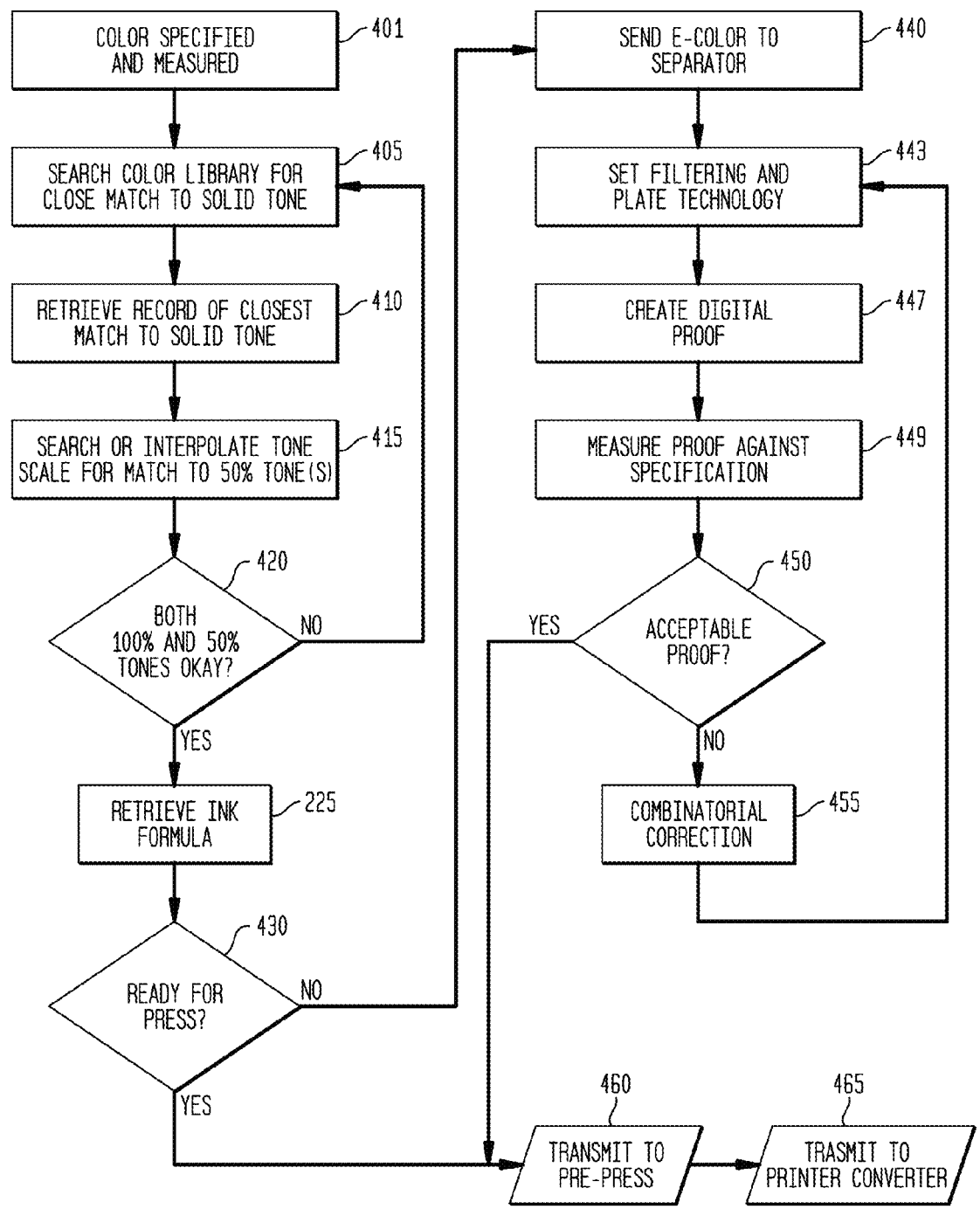
FIG. 4 depicts a process flow chart according to an exemplary embodiment of the present invention.

FIG. 4 depicts an exemplary process flow for such automated searching according to an exemplary embodiment of the present invention. FIG. 4 shows a flowchart associated with matching a given specified color and ultimately retrieving an ink formula for printing the specified color. For example, a designer may, for example, design a new box for a breakfast cereal or a new flexible pouch for a snack food item such as potato or corn chips. The design will have one or more SPOT colors which need to be matched. Such a process can be carried out in an exemplary embodiment of the present invention.

This can occur in various implementations. A designer (or other relevant party to a color choice decision) can, for example, be granted access to a database according to an exemplary embodiment of the present invention over a computer network, such as, for example a VPN or the Internet, and can run searches thereby. Alternatively, a designer (or other relevant party) can submit specified colors and request that the database be searched, and a customer service agent can, for example, initiate the database search and communicate the results to the designer or other relevant party.

Thus, with reference to FIG. 4, at 401 a color can, for example, be electronically specified and measured. At 405 a search can be performed for close color or spectral matches to the solid tone of the specified color. At 410, for example, a record from the database can be retrieved that is the closest match to the solid tone of the specified color. Then, at 415, the database can be searched for records that also match the specified color at various halftone scales. In general a match can be sought for one or more halftones, and in exemplary embodiments of the present invention this can be between 3-10 halftones. In alternative exemplary embodiments, matching halftones may be desirable, depending upon the particular design and use of halftones in it.

If no record is found that matches the halftone scales for the specified color, then at 415 the closest records can be interpolated as described below to obtain the correct ink formula. At 420, if the specified solid color and its halftones are matched, process flow proceeds to 225, where the ink formula obtained is retrieved. If there is no match of both the specified solid color and its halftones, process flow returns to 405, where the search loop is again begun. It is noted in this connection that the search loop may be repeated a number of times, inasmuch as for a specified solid color multiple matching ink formulas can be obtained, as shown in FIG. 1 regarding exemplary violet and yellow ink formulations.

Once a suitable ink formula is retrieved at 425, process flow continues to 430, to determine if the match is acceptable for a final press run. If the match is of an acceptable quality, then spectral data and viewable electronic images can be, for example, transmitted to pre-press at 460 and to a printer/converter at 465 for review and/or production.

If at 430 the match from the electronic color palette is not satisfactory, and thus not ready for press, then process flow, following the "No" branch at decision 430, continues to 440, where the spectral data for the color, properly formatted if necessary, can be electronically transmitted to a separator for filtering and proofing. At 443 the separator can, for example, set filtering and plate technology to produce a final color. Corrections may be made for converting processes that may be required, such as, for example, to account for lamination. When the separator achieves a desired match, a digital proof can be created at 447.

At 449 the digital proof can, for example, be measured and compared to the original electronic sample received at 401. At decision 450, a determination can be made whether the proof is of an acceptable match. Preferably, the designer or other interested party, such as personnel at the product manufacturer, makes this determination. If the proof is not an acceptable match, at 455 further combinatorial corrections can be made, and process flow can return to 447 for a repeat of the proofing process.

At 450, if the designer, for example, or other interested party, for example, decides that the proof submitted by the separator is acceptable, then at 460 the color can be sent to pre-press, followed by transmission to the printer converter at 465, as described above.

In exemplary embodiments of the present invention, the formulas that are stored in an exemplary shade library which contains information on the color of inks for full tones and halftones at various film weights are unique combinations of matter, and demonstrate the ability to select and communicate ink color formulas with specific brand color properties for a graphic or package designer and/or brand owner. Once such a formula has been established, as it has, for example, in Sun Chemical's SmartColour™ Global Shade Library, it can only be reproduced by duplicating exactly this unique combination of matter—making each and every formula in such a shade library novel.

Figure 5:
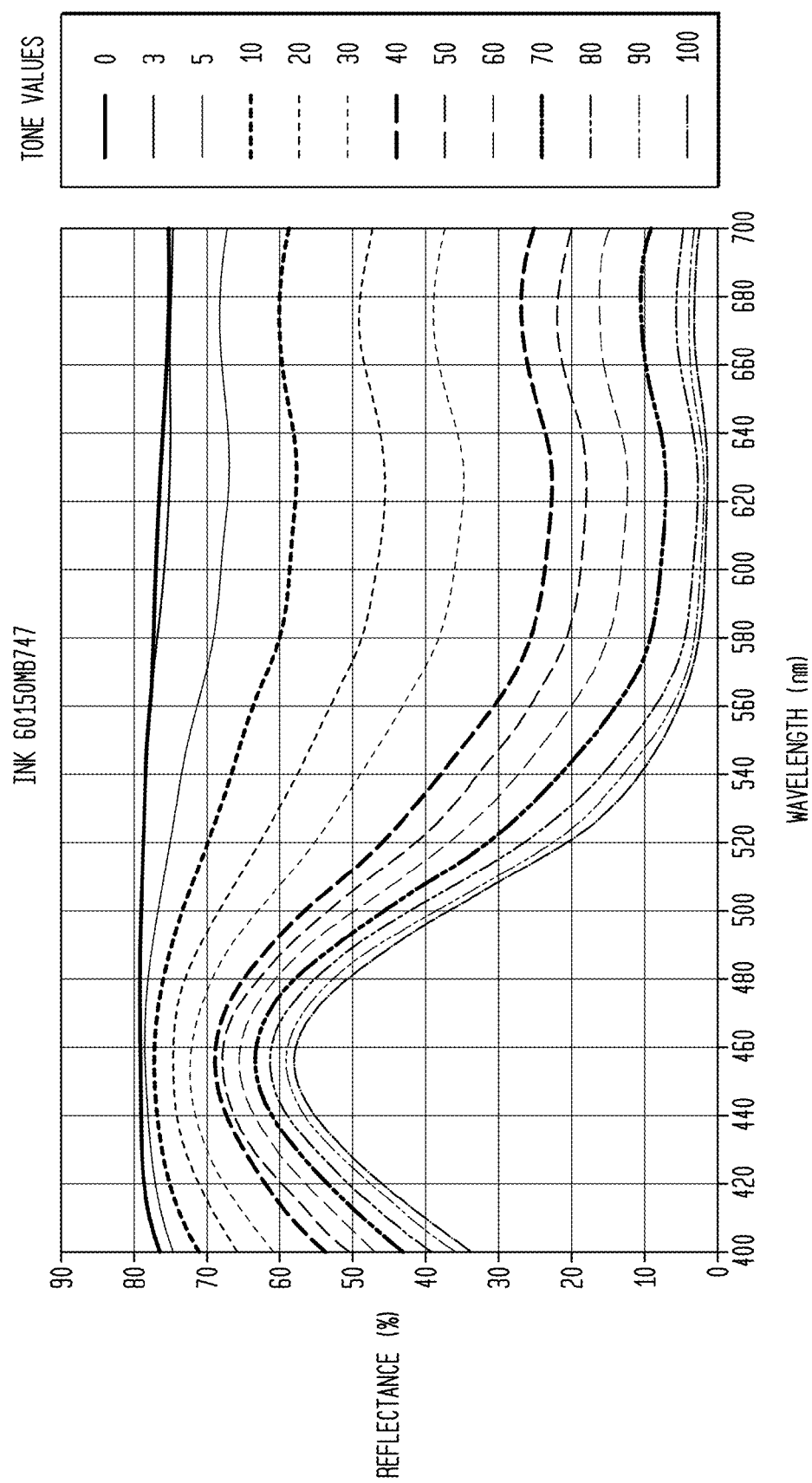
FIG. 5 depicts a spectral reflectance factor curve for an exemplary SPOT violet color.
Figure 6:
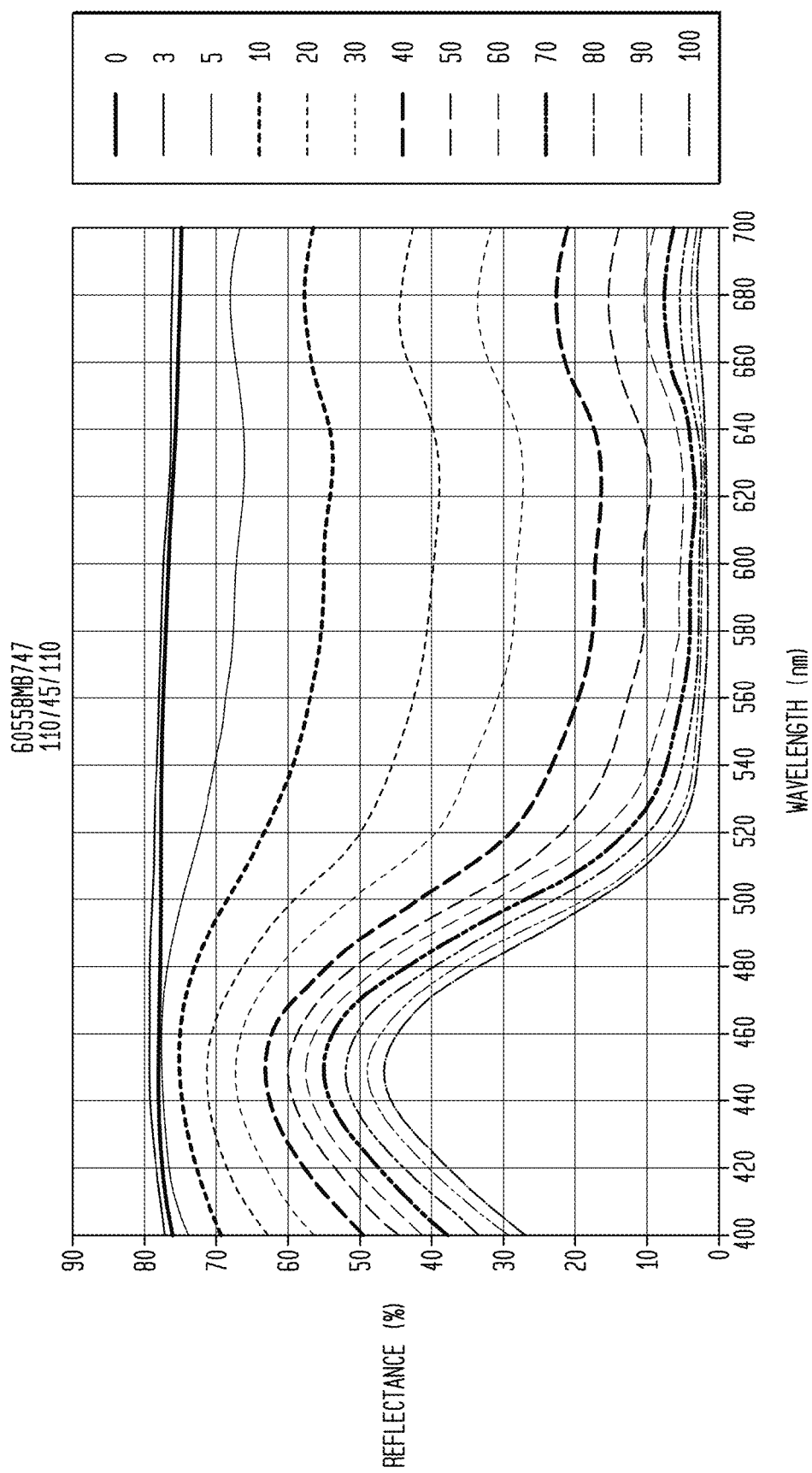

Next described is an exemplary interpolation process that occurs at 415 of FIG. 4, if required. FIG. 5 depicts a spectral reflectance factor curve for an exemplary SPOT violet color, identified as "Ink 60150MB747," that can be, for example, specified by a customer, designer or other interested party. The spectral fingerprints of the inks and halftones allow for the derivation of a new ink and tone scale intermediate between two known inks in exemplary embodiments of the present invention. Because an exemplary library according to the present invention contains a large number of inks and their associated halftones, a search will normally return a color and tone scale that is desired. However, if the search does not return a suitable tone scale, it possible to create a "new" ink and tone scale by interpolation between existing points for records then in the library. Such an interpolation is possible because the differences between the inks on a spectral basis will be small. FIGS. 6 and 7 depict spectral reflectance factor curves for two exemplary violet colors which match "Ink 60150MB747" at the 100% tone, but mismatch at nearly all other tones. The color whose spectral reflectance is depicted in FIG. 6 is identified as 60558MB747 and that whose spectral reflectance depicted in FIG. 7 is identified as 60970MB747. In this example an initial "6" denotes that the color is in the purple family.

It is noted that the spectral shapes of FIGS. 6 and 7 are very similar, yet, these colors' color coordinate plots show that they are quite distinct, as shown in FIG. 8 (these two violets are plotted as the diamond and triangle plots at the bottom of FIG. 8, also shown at the bottom of FIG. 5). To create an ink with a halftone value intermediate between these two closest matches in the database, one converts the data to absorbance, as the absorbance curve is proportional to the colorant concentration by Beer's law of spectroscopy. If the absorbance data is then proportionally interpolated at each spectral point, in exemplary embodiments of the present invention a new absorbance curve can be obtained that is representative of the mixture of the colorants of the first ink and the second ink. The interpolated absorbance curve can then be converted back to reflectance factor, and its colorimetric coordinates can then be computed. FIG. 8 depicts just such an exemplary "New Violet" halftone scale plotted on the gamut chart with the closest two component inks obtained from the exemplary database.

The New Violet ink halftone series plots intermediate between the two violet inks located in the database. In exemplary embodiments of the present invention, the color of the mid-points in a halftone series can be adjusted to provide exactly the color desired. The solution is completely linear and can be automated using any number of well known linear optimization or regression algorithms to develop the correct mixture of the first and second known inks. Because the mixtures are interpolated in absorbance space, the mixture values can be applied directly to the known composition of matter to develop the new, unique composition that produces the desired halftone scale of the specified SPOT color.

As described above, in exemplary embodiments of the present invention a shade color database, with multiple records, each containing, inter alia, solid color and halftone chromaticness information, can be searched. In such a library, the spectral signatures of the solids and halftones for a variety of colors can be fully captured. The spectral signature allows for trichromatic color coordinates, such as, for example, CIELAB $L^*a^*b^*$ values, to be computed for any ink formula as printed on a given substrate. As noted, such an exemplary database is described in U.S. Pat. Nos. 7,034,960, 7,202,976 and 7,268,918, and copending U.S. patent application Ser. No. 11/732,086 (U.S. Patent App. Pub. No. 2007/0263249), whose disclosures have been incorporated herein by reference.

In exemplary embodiments of the present invention, in the library, the colors of inks containing customer mixes of colorants, known as SPOT colors, can be printed on a printing device using a halftone screen method, and can be, for example, characterized for color at each tone step and the color values stored in a computer database. Additionally, in such an exemplary shade color library, the color values can be stored on at least one system processor and can be accessed via an electronic network, including, for example, a local area network (LAN), a wide area network, (WAN) or the Internet.

In such an exemplary shade color library, the ink formulas can also be stored on at least one system processor and accessed via an electronic network, including a local area network (LAN), a wide area network, (WAN) or the internet, indexed by the color values. In exemplary embodiments of the present invention, in the library, the inks can be printed, for example, using a printing system conforming to the rules of flexography, including the use of a patterned anilox roller containing the screen pattern and a flexible plate containing the halftone patterns. Additionally, for example, the inks can be printed using a printing system conforming to the rules of offset lithography, including the use of a patterned, planographic plate containing both the screen pattern and the halftone patterns. Such a screen pattern can, for example, be a conventional pattern in which the size of the ink areas increase in area until there is complete overlap from one image area to another (analog screening) or, for example, the screen pattern can be a modern, digital pattern of very small dots, whose frequency of location increases until there is complete overlap from one image area to another (stochastic screening).

In exemplary embodiments of the present invention, in the library, the inks can also be printed, for example, using a printing system conforming to the rules of gravure intagliography, including the use of a patterned, etched or engraved cylinder containing both the screen pattern and the halftone patterns.

In exemplary embodiments of the present invention the obtained ink formula forms a novel and unique combination of colorants such that it will not be possible to achieve the simultaneous match to both solid color and halftone color, on the given substrate using the designated printing methods, utilizing any other combination of colorants.

Figure 11:
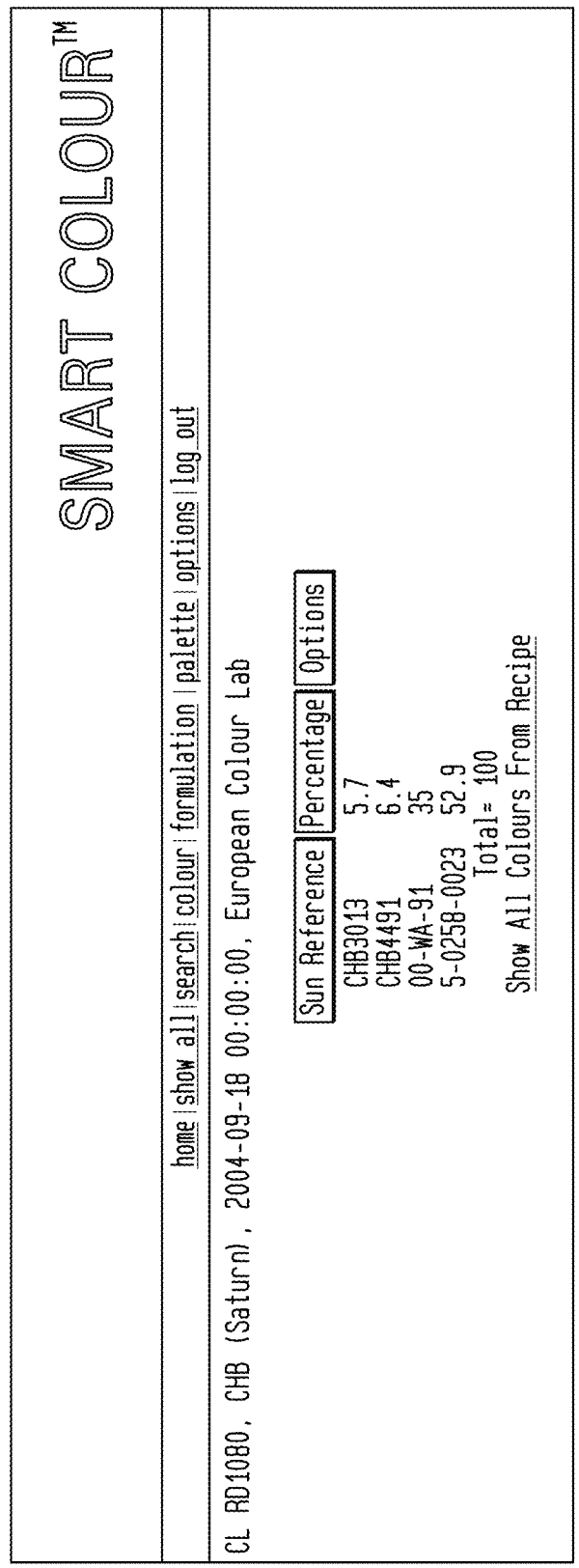
FIG. 11 depicts an exemplary composition of matter record according to an exemplary embodiment of the present invention.
Figure 12:
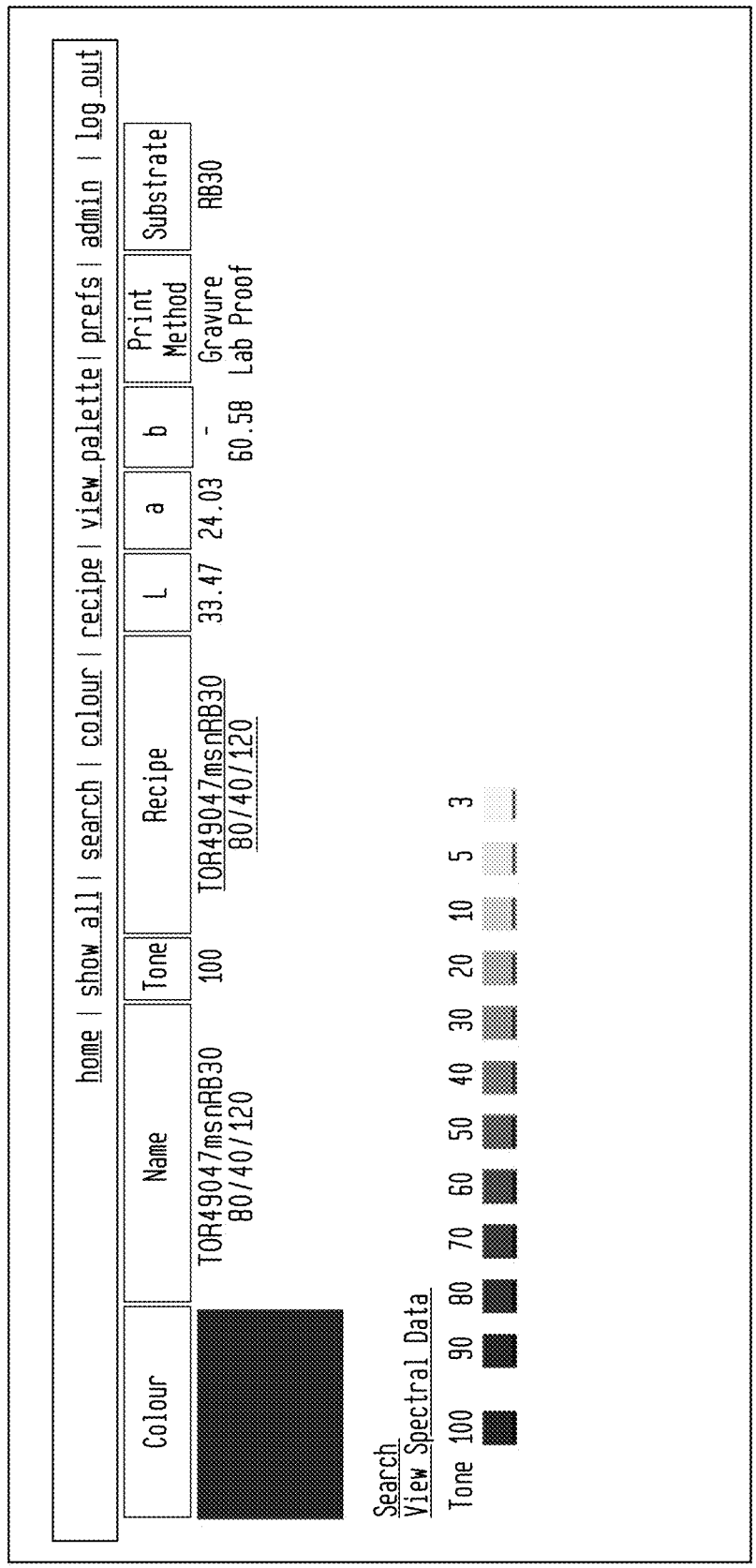
FIG. 12 depicts an exemplary screen shot from an exemplary color shade library depicting a solid color and various halftones according to an exemplary embodiment of the present invention.

FIGS. 9-11 depict various aspects of an exemplary shade color library according to exemplary embodiments of the present invention. FIG. 9 depicts an exemplary shade library record structure, FIG. 10 depicts an exemplary shade library search screen, and FIG. 11 depicts an exemplary composition of matter record. FIG. 12 depicts an exemplary screen depicting a solid color and various halftones according to an exemplary embodiment of the present invention.

Finally, an exemplary specification for such a color shade library is provided in Appendix A hereto.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

APPENDIX A

Exemplary Global Shade Library

Database Field Descriptions, Naming Conventions and Relationships

Color Technical Name
  The first character is a digit that identifies the hue of the shade (White—1, Yellow—2, Orange—3, Red—4, Blue—5, Purple—6, Green—7, Brown—8, Black and Grays—9). The next 5 digits are a sequence or serial number, Then the 3-5 character ink system identifier, the 3-5 character substrate identifier, the engraving specification and finally the nominal tone scale value. A green shade proofed offset on the APCO II/II coated paper using a 133 line screen and a 40% dot, might look like: 701015OFFAPCO133-40

Substrate

| Type | Detail | Weight | Color | Surface | Resulting Description |
|------|--------|--------|-------|---------|----------------------|
| Board | CUK$^I$ | .018 in/450 μm | white | top | Board CUK 18 Pt White Top Surface |
| Board | CCNB$^{II}$ | .018 in/450 μm | white | top | Board CCNB 18 Pt White Top Surface |
| Board | SBS$^{III}$ | .018 in/450 μm | white | top | Board SBS 18 Pt White Top Surface |
| Paper | Gloss$^{IV}$ | 80#/120 g/m$^2$ | white | top | Paper Gloss 80# White Top Surface |
| Paper | Matte$^V$ | 80#/120 g/m$^2$ | white | top | Paper Matte 80# White Top Surface |
| Paper | Opaque$^{VI}$ | 80#/120 g/m$^2$ | white | top | Paper Opaque 80# White Top Surface |
| Film | PS$^{VII}$ | 7 mil | clear | reverse | Film PS 7 Mil Clear Reverse Surface |
| Film | PS | 7 mil | clear | reverse | Film PS 7 Mil Clear Reverse Surface |
| Film | PS | 7 mil | white | reverse | Film PS 7 Mil White Reverse Surface |
| Film | PS | 7 mil | white | reverse | Film PS 7 Mil White Reverse Surface |
| Film | PET$^{VIII}$ | 7 mil | white | top | Film PET 7 Mil White Top Surface |
| Film | PET | 7 mil | white | top | Film PET 7 Mil White Top Surface |
| Film | PET | 7 mil | white | top | Film PET 7 Mil White Top Surface |
| Film | OPP$^{IX}$ | 7 mil | clear | reverse | Film OPP 7 Mil Clear Reverse Surface |
| Film | OPP | 7 mil | clear | reverse | Film OPP 7 Mil Clear Reverse Surface |
| Film | OPP | 7 mil | white | reverse | Film OPP 7 Mil White Reverse Surface |
| Film | OPP | 7 mil | white | reverse | Film OPP 7 Mil White Reverse Surface |
| Film | SHD | 7 mil | pearl | top | Film pearlised SHD Top Surface |
| Film | WPP | 7 mil | white | top | Film White Pigmented Poly Top Surface |
| Film | CLR | 7 mil | clear | top | Film Clear Poly |
| Film | MPP | 7 mil | metal | top | Film Metalised Primed Poly |
| Paper | Coated | 41#/60 g/m$^2$ | white | top | Paper Coated 41# White Top Surface |
| Paper | Kraft | 63# | natural | top | Paper Kraft 63# Natural Top Surface |
| Paper | Kraft | 63# | natural | top | Paper Kraft 63# Natural Top Surface |
| Paper | Kraft bag | 63# | white | top | Paper Kraft Bag 63# White Top Surface |
| Paper | Kraft bag | 63# | white | top | Paper Kraft Bag 63# White Top Surface |
| Paper | Kraft liner | 63# | mottled | top | Paper Kraft Liner 63# Mottled Top Surface |
| Paper | Kraft liner | 63# | mottled | top | Paper Kraft Liner 63# Mottled Top Surface |
| Paper | Synthetic | 63# | white | top | Paper Synthetic 63# White Top Surface |
| Paper | Uncoated | ? | white | top | MGBK Uncoated Paper |
| Paper | Coated | 100#/150 g/m$^2$ | white | top | APCO II/II Coated Paper |
| Paper | Coated | ? | white | top | Coated Paper |
| Paper | Coated | ? | white | top | ALGRO Coated Paper |
| Paper | Coated | ? | white | top | HC20 Coated Paper |

Coating
  Overprint coating for protection or slip properties
  Aqueous
  Varnish
  UV
Laminate
  Typically applies to film substrate types only, but can also be applied over some board stock
Backed by White
  Applies to film substrates only with clear color
Relationship of Print Method—Engraving—Film Weight
  Flexographic
    Line Screen/Volume
      Plate Screen Ruling (L/in for US and L/cm for Europe)
      Anilox Screen Ruling (L/in for US and L/cm for Europe)
      Anilox Volume (bcm/in2 for US and cm3/m2 for Europe)
  Gravure
    Engraving/Film Weight
      Screen Ruling (L/in for US and L/cm for Europe)
      Screen Angle (in degrees)
      Stylus Angle (also in degrees)
      Ink Film Weight 1-16 g/m2 (need to verify this)
  Lithographic (Offset)
    Line Screen
      L/in for US and L/cm for Europe
  Other (Lab proofing methods, etc.)
    Free text?
Film Weight
  No relationships
  Numeric field from 1-15

Designates which band of the proof—2 bands in gravure (1-2), 3 bands in flexo (3,6,10)
Ink System
  Linked to fitness for use parameters (lightfastness, chemical resist)
  Not normally selectable by the user
  Certain inks work for specific print processes and for specific substrates
  Suggested naming logic follows

| Ink Type | Details | Composition | Resulting Description |
|----------|---------|-------------|----------------------|
| Solvent | 1165 | Polyamide | Solvent 1165 Polyamide |
| Solvent | 1190 | Polyamide | Solvent 1190 Polyamide |
| Solvent | 0310 | Nitrocellulose | Solvent 0310 Nitrocellulose |
| Solvent | 7110 | Urethane | Solvent 7110 Urethane |
| Solvent | Jupiter | Nitrocellulose | Solvent JUP Nitrocellulose |
| Paste | Offset | | Sheetfed Offset |
| Water | PMA1 | Acrylic | Water PMA1 Acrylic |
| Water | PMA2 | Acrylic w/clay | Water PMA2 Extender |

Fitness for Use
  Linked to Ink system pigmentation
  Lightfastness
    Numeric specification in hours
      Fadometer 4, 8, 24, 48, 100, 200, 300+ hrs
      Shelf life of 115-145 times Fadometer results
    Numeric representation in months
      Shelf life of 0.15-0.20 times Fadometer results
  Chemical resistance
    Alkali yes or no
    Alcohol yes or no Heat resistance
   Numeric specification in degrees (Centigrade or Fahrenheit)
   Linked to Ink system formulation
Rub resistance
   Numeric Sutherland rub-test specification (cycles with weight)
Slipperiness
   Numeric static coefficient of friction (SCOF)
   Numeric kinetic coefficient of friction (KCOF)
Chemical resistance
   Grease/oil yes or no
Moisture resistance
   Moisture yes or no
Opacity Index
   No relationships
   Numeric value from 0.0 to 1.0
Measurement Device
   No relationships
   Text field
   Suggested naming logic follows

| Geometry | Manufacturer | Model | Aperture | Filter | Resulting Description |
|---|---|---|---|---|---|
| 0:45 | X-Rite | 939 | 4 mm | No filter | 0:45 X-Rite 939 4 mm No filter |
| 45:0 | GretagMacbeth | SpectroEye | 4 mm | Polarization | 45:0 GM SpectroEye 4 mm w/Pol |
| 45:0 | GretagMacbeth | SpectroEye | 4 mm | None | 45:0 GM SpectroEye 4 mm wo/Pol |
| SCI | Datacolor | SF600 | 6.6 mm | UV cutoff | Sphere Included Datacolor SF600 6.6 mm wo/UV |
| SCE | Datacolor | SF600 | 6.6 mm | UV cutoff | Sphere Excluded Datacolor SF600 6.6 mm wo/UV |
| SCI | Datacolor | Mercury | 4 mm | UV cutoff | Sphere Included Datacolor Mercury 4 mm wo/UV |
| SCE | Datacolor | Mercury | 4 mm | UV cutoff | Sphere Excluded Datacolor Mercury 4 mm wo/UV |

Measurement Data
   Linked to Measurement System and Tone Scale Data
   Spectral reflectance data
     Number of data points 40, 36, 31
     Starting wavelength 360 nm, 380 nm, 400 nm
     Ending wavelength 700 nm, 730 nm, 750 nm
     Array of data values
   Tristimulus value data
     CIE XYZ tristimulus values for D50/1931 Observer
     CIE L*a*b* coordinates for D50/1931 Observer
     CIE L*a*b* coordinates for D50/1964 Observer
Tone Scale Data
   Linked to Print Method
   Tone scale data
     Number of tone values (11 . . . 4) {0% tone—unprinted substrate}
     Tone Value Increase at 50%—nominally 0% or the print method default
Composition Data
   Linked to Ink System and to Color Technical Name
   Listing of material components and relative amounts
     Base Color 1
     Base Color 2
     Base Color 3
     Clear Technical Varnish or Extender
     Solvent (if required)

[i] Coated Unbleached Kraft (CUK)
   Other names: Solid Unbleached Sulfate™ (SUS™) under Riverwood International's trademark, or Coated Natural Kraft™ (CNK™) under Mead's trademark.
   Uses: Most popular material for beverage carriers (i.e., six-packs of beer, soda or water, as well as larger 24-packs). Also used in larger-sized packaging (detergents and other non-food items). Sometimes used for shipper displays and as outer ply for small corrugated containers.
   Advantages: Better stiffness, tear resistance and inherent moisture resistance, compared to SBS. Better printing and strength qualities than CCNB. Can substitute for SBS or CCNB in thinner calipers, reducing amount of packaging material going into waste stream.
   Properties: Clay-coated white printing surface with naturally brown backside. No bleaching or optical whiteners used. Calipers range from 0.014 to 0.030. Suitable for high-quality printing, as well as foil and film laminating. Non-petroleum based additives or special coatings may be added for additional moisture resistance.

[ii] Clay Coated Newsback (CCN)
   Other names: Coated Recycled Board (CRB). Uncoated Recycled Board (URB) also available. CCN and URB are made on cylinder machines, and therefore can be referred to generically as cylinderboard.
   Uses: Custom packaging for retail products including food products, sporting goods, toys, automotive accessories, hardware parts and accessories, cosmetic items and pharmaceutical items.
   Advantages: Made from 100% recovered paper, from paper mills, board converters and post-consumer sources.
   Properties: Double-coated to provide smooth white surface for packaging graphics. Opaque, viscous coating levels out surface, top coating provides brightness, gloss and ink receptivity. Sheets range from 80-83 brightness and 2.4-3.5 Parker Print smoothness

[iii] Solid Bleached Sulfate (SBS)
   Other names: Coated Bleached Kraft
   Uses: Confectioneries, bakery products, butter, frozen foods, dry foods, pet foods, tobacco, gift boxes, entertainment, software, retail boxes. Long-fiber softwood pulp can also be used for some liquid packaging.
   Advantages: All-virgin content yields uniform cleanliness and purity, highest brightness and whiteness, better printing surface and coating surface, and a higher stiffness ratio for better dimensional stability.
   Properties: Bleached white with coated pigment applied inline during papermaking. Calipers range from 0.012 to 0.024. Virgin pulp comes from softwoods and hardwoods. Absolutely no rainforest woods used.

[iv] StoraEnso Centura Gloss Text: 96 brightness, 80 gloss, 96 opacity

[v] Unisource Starbrite Opaque Text: 90 brightness, 21 gloss, 95 opacity

[vi] Corniche Matte Text:
[vii] Polystyrene
[viii] Polyethylene terephthalate—chemical name for biaxially oriented polyester
[ix] Oriented (or biaxially-oriented) polypropylene

What is claimed is:

1. A method for matching a specified color, comprising:
accessing a database of a plurality of records of color shades, each of the records of the plurality of records having solid color co-ordinates, halftone color co-ordinates, printing process information, and substrate information;
searching the database to obtain a record matching a specified SPOT color at both a solid color and one or more halftones for a specified printing process and a specified substrate; and
outputting from said record a unique ink formula that satisfies a desired color for both a solid color print and one or more halftone prints for said printing process and said substrate; printing with the said printing process on the said substrate using said ink formula.

2. The method of claim 1, wherein in the database a plurality of inks each containing customer mixes of colorants have been printed on a printing device using a halftone screen method, and have been characterized for color at each tone step.

3. The method of claim 1, wherein said one or more halftone prints comprise at least 3 halftone prints.

4. The method of claim 1, wherein said one or more halftone prints comprise at least 10 halftone prints.

5. The method of claim 1, wherein in the database a plurality of inks each containing customer mixes of colorants have been printed on a printing device using a halftone screen method and have been characterized for color at each tone step.

6. The method of claim 1, wherein the database is stored on at least one system processor and accessed by a user via an electronic network, including a local area network (LAN), a wide area network (WAN), or the internet.

7. The method of claim 6, wherein a plurality of ink formulas associated with the plurality of records are indexed by the color shades.

8. The method of claim 2, wherein in the database each of the plurality of inks have been printed using a printing system conforming to the rules of flexography, including use of a patterned anilox roller containing a screen pattern and a flexible plate containing a halftone pattern.

9. The method of claim 2, wherein in the database each of the plurality of inks have been printed using a printing system conforming to the rules of offset lithography, including use of a patterned, planographic plate containing a screen pattern and a halftone pattern.

10. The method of claim 9, wherein the screen pattern is one of a conventional pattern in which a size of each ink area increases in area until there is a complete overlap from an image area to another image area (analog screening) or a modern, digital pattern of very small dots, whose frequency of location increases until there is a complete overlap from an image area to another image area.

11. The method of claim 2, wherein in the database each of the plurality of inks have been printed using a printing system conforming to the rules of gravure intagliography, including the use of a patterned, etched or engraved cylinder containing a screen pattern and a halftone pattern.

12. The method of claim 1, wherein the outputted ink formula is a unique combination of colorants such that it is not be possible to achieve the simultaneous match to both solid color and halftone colors on the given substrate using the designated printing methods, utilizing any other combination of colorants.

13. The method of claim 1, wherein said searching the database to obtain a record matching a specified SPOT color is effected by inputting to the database chromaticness information for said SPOT color at both said solid and said one or more halftones for said printing process and said substrate.

14. The method of claim 1, wherein if an acceptable match to said specified SPOT color is not obtained, obtaining two closest matches and interpolating to obtain an ink formula for the specified SPOT color.

15. The method of claim 14, wherein said interpolating includes:
converting reflectance data from said two closest matches to absorbance data;
proportionally interpolating at each spectral point to obtain a new absorbance curve that is representative of the inks of the two closest matches;
converting the absorbance curve back to a reflectance factor; and
computing colorimetric coordinates of the reflectance factor.

16. The method of claim 15, wherein said interpolating is automated using a linear optimization or regression algorithms to develop ink formulas of the two closest matches.

17. A computerized method for producing a color match to a proof, comprising:
accessing a database of a plurality of records of color shades, each of the records of the plurality of records having solid color co-ordinates, halftone color co-ordinates, printing process information, and substrate information;
searching the database to obtain a record matching a desired specified SPOT color at both a solid print and one or more halftone prints for a selected printing process and a selected substrate; and
outputting from said record a unique ink formula that satisfies the color coordinates for both said solid color print and said one or more halftone prints for said printing process and said substrate; printing with the said printing process on the said substrate using said ink formula.

18. The computerized method of claim 17, wherein in the database a plurality of inks each containing customer mixes of colorants have been printed on a printing device using a halftone screen method, and have been characterized for color at each tone step.

19. The computerized method of claim 17, wherein said one or more halftone prints comprise at least 3 halftone prints.

20. The computerized method of claim 17, wherein said one or more halftone prints comprise at least 10 halftone prints.

21. The computerized method of claim 17, wherein in the database a plurality of inks each containing customer mixes of colorants, known as SPOT colors, have been printed on a printing device using a halftone screen method such as a stochastic or digital screen, and have been characterized for color at each tone step.

22. The computerized method of claim 18, wherein the database is stored on at least one system processor and can be accessed by a user via an electronic network, including a local area network (LAN), a wide area network (WAN), or the internet.

23. The computerized method of claim 18, wherein a plurality of ink formulas associated with the plurality of records are indexed by the color shades.

24. The computerized method of claim 18, wherein in the database each of the plurality of inks have been printed using a printing system conforming to the rules of flexography, including use of a patterned anilox roller containing a screen pattern and a flexible plate containing a halftone pattern.

25. The computerized method of claim 18, wherein in the database each of the plurality of inks have been printed using a printing system conforming to the rules of offset lithography, including use of a patterned, planographic plate containing a screen pattern and a halftone pattern.

26. The computerized method of claim 25, wherein the screen pattern is one of a conventional pattern in which a size of each ink area increases in area until there is a complete overlap from an image area to another image area (analog screening) or a modern, digital pattern of very small dots, whose frequency of location increases until there is a complete overlap from an image area to another image area.

27. The computerized method of claim 18, wherein in the database each of the plurality of inks have been printed using a printing system conforming to the rules of gravure intagliography, including the use of a patterned, etched or engraved cylinder containing a screen pattern and a halftone pattern.

28. A method for matching a specified color, comprising:
providing a database of a plurality of records of color shades, each of the records of the plurality of records having solid color co-ordinates, halftone color co-ordinates, printing process information, and substrate information;
searching the database to obtain a record matching a specified SPOT color at both a solid color and one or more halftones for a specified printing process and a specified substrate; and
outputting from said record a unique ink formula that satisfies a desired color for both a solid color print and one or more halftone prints for said printing process and said substrate when printed with the said printing process on the said substrate.

29. The method of claim 28, wherein in the database a plurality of inks each containing customer mixes of colorants have been printed on a printing device using a halftone screen method, and have been characterized for color at each tone step.

30. The method of claim 28, wherein said one or more halftone prints comprise at least 3 halftone prints.

31. The method of claim 28, wherein said one or more halftone prints comprise at least 10 halftone prints.

32. The method of claim 28, wherein in the database a plurality of inks each containing customer mixes of colorants, known as SPOT colors, have been printed on a printing device using a halftone screen method such as a stochastic or digital screen, and have been characterized for color at each tone step.

33. The method of claim 28, wherein the database is stored on at least one system processor and can be accessed by a user via an electronic network, including a local area network (LAN), a wide area network (WAN), the internet.

34. The method of claim 33, wherein a plurality of ink formulas associated with the plurality of records are indexed by the color shades.

35. A system for matching a specified color, comprising:
a memory in which is stored a database of a plurality of records of color shades, each of the records having solid color co-ordinates, halftone color co-ordinates, printing process information, and substrate information;
a search interface arranged to receive a specified SPOT color and corresponding chromaticness data at both a solid and one or more halftones for said SPOT color; and
a data processor arranged to:
search the database and obtain a record that matches said chromaticness data given said printing process and said substrate information; and
output from said record a unique ink formula that satisfies desired color coordinates for both a solid color print and one or more halftone prints for said printing process and said substrate.

36. The system of claim 35, where said data processor is further arranged to an interpolation between two closest matching records to said specified SPOT color to obtain an ink formula for the specified SPOT color.

37. The system of claim 36, wherein said interpolation includes:
converting reflectance data from said two closest matches to absorbance data;
proportionally interpolating at each spectral point to obtain a new absorbance curve that is representative two closest matches;
converting the absorbance curve back to a reflectance factor; and
computing colorimetric coordinates of the reflectance factor.

* * * * *